United States Patent [19]

Bertram et al.

[11] Patent Number: 5,060,773

[45] Date of Patent: Oct. 29, 1991

[54] SINGLE-ACTION FREEWHEEL CLUTCH WITH SUBSTANTIALLY LARGE CENTRAL DIAMETER

[75] Inventors: Johannes Bertram, Unna-Billmerich; Ulrich Krug, Hagen; Peter Grünewald, Fuldabrück, all of Fed. Rep. of Germany

[73] Assignee: Hoesch Aktiengesellschaft, Dortmund, Fed. Rep. of Germany

[21] Appl. No.: 605,914

[22] Filed: Oct. 30, 1990

[30] Foreign Application Priority Data

Nov. 3, 1989 [DE] Fed. Rep. of Germany ....... 3936586

[51] Int. Cl.$^5$ ............................................. F16D 13/00
[52] U.S. Cl. ................................................. 192/45.2
[58] Field of Search ....................................... 192/45.2

[56] References Cited

U.S. PATENT DOCUMENTS

| | | | |
|---|---|---|---|
| 1,906,410 | 5/1933 | Potgieter | 192/45.2 |
| 1,946,038 | 2/1934 | Starbuck | 192/45.2 |
| 3,302,761 | 2/1967 | Zloteic | 102/45.2 |
| 3,739,889 | 6/1973 | Frey | 192/45.2 |
| 4,693,351 | 9/1987 | Adolfsson | 192/45.2 |

FOREIGN PATENT DOCUMENTS

| | | | |
|---|---|---|---|
| 62220 | 8/1925 | Sweden | 192/45.2 |
| 1165825 | 7/1985 | U.S.S.R. | 192/45.2 |

Primary Examiner—Allan D. Herrmann
Assistant Examiner—Nicholas Whitelaw
Attorney, Agent, or Firm—Max Fogiel

[57] ABSTRACT

A single-action freewheel with an open diameter greater than 50 mm and with an inner and outer ring. The object is to provide an open central diameter of more than 500 mm while allowing high torques in a freewheel that can be made without consuming much material. The invention is charaterized by two or more rows (3 & 4) of shoes or jaws between the inner ring (1) and the outer ring (2) with normal clutching forces tht act more or less on one plane (13) or diameter, by one or more revolving webs (6) connected to the rings and extending between the rows, and by an activating mechanism (9) that approximately simultaneously tightens and loosens the shoes.

12 Claims, 1 Drawing Sheet

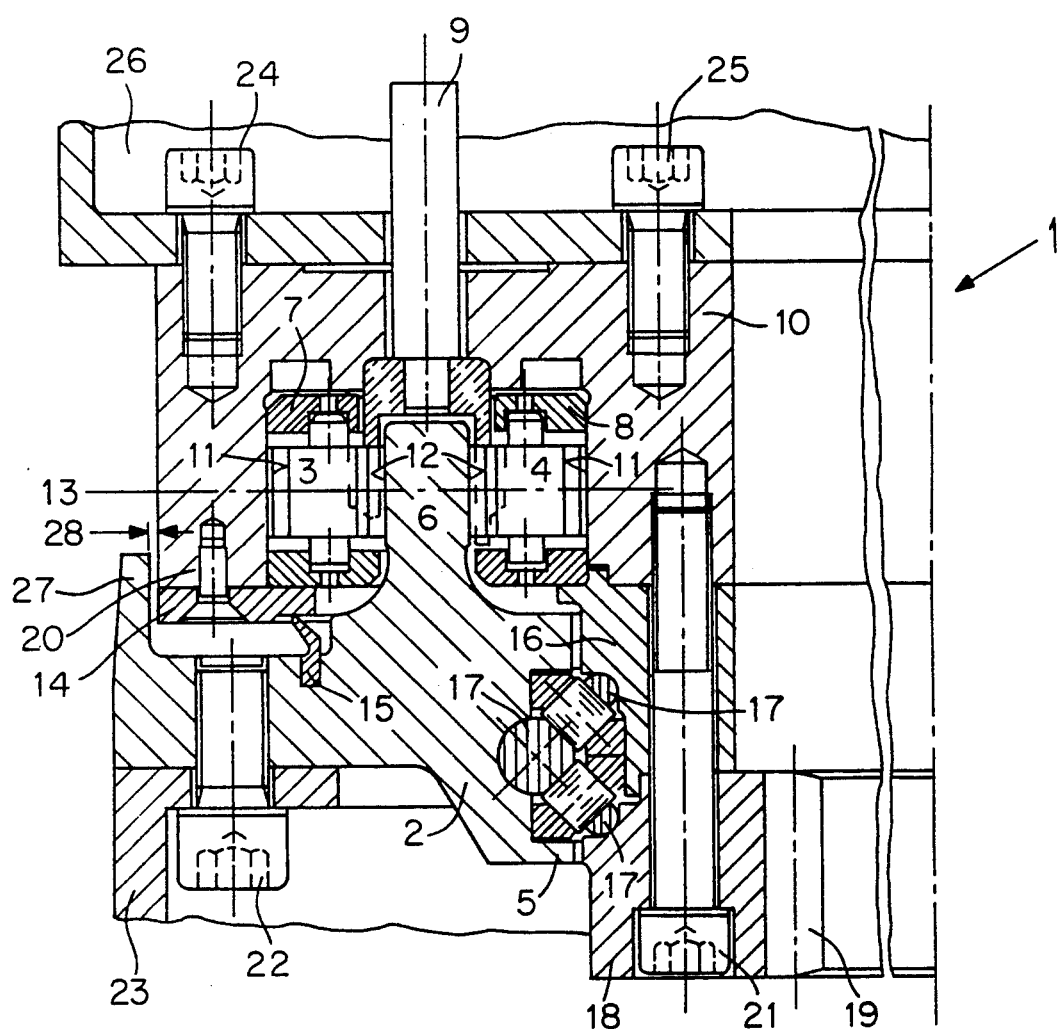

5,060,773

SINGLE-ACTION FREEWHEEL CLUTCH WITH SUBSTANTIALLY LARGE CENTRAL DIAMETER

BACKGROUND OF THE INVENTION

Many applications require an open central diameter, in which case the shaft will be hollow. Freewheels employed in power shovels, cranes, and turntables for example demand open central diameters of more than 500 mm.

A double-action shoe-overriding freewheel is known from German AS 1 259 151. It has two rows of shoes or jaws. Which row is engaged depends on the speed at which the engine and machinery are rotating. One drawback of this freewheel is that it cannot transmit extremely high stopping forces. The forces that occur normal to the shoes and act on the races during the clutching process are powerful enough to deform the rings, and the freewheel will no longer be able to function. Furthermore, the single-point stress that derives from the tilt of the races will destroy the shoes and races.

SUMMARY OF THE INVENTION

The object of the current invention is accordingly a single-action freewheel that will provide an open central diameter of more than 500 while allowing high torques and that can be made without consuming much material.

BRIEF DESCRIPTION OF THE DRAWINGS

The particular advantages of the invention derive from the ability of even a comparatively small freewheel with an open central diameter of more than 500 mm to apply powerful stopping forces.

The advantage of several rows of shoes acting simultaneously on one plane or diameter with revolving webs connected to one of the rings between them is that the transmitted clutching torque is the sum of the individual torques of each row of shoes. Thus, in contrast to a version with only one row of active shoes, each row needs to contribute only the fraction of the requisite friction represented by the inverse of the total number of rows. The result is a similar reduction in the normal forces applied by the individual shoes in inverse proportion to the number of rows.

Orienting the rows of shoes with their normal forces toward one plane or diameter and with revolving webs that are connected to the rings extending between the rows ensures that the normal forces from the rows that act on opposite sides of the webs will include almost no bending forces. Another advantage is that the ring that accommodates the outer rows of shoes is expanded only by the fraction of overall normal forces that equals the inverse of the total number of rows.

The advantage of providing the freewheel with its own housing is that it will not dictate the materials and heat treatments for example required for any components connected to it.

One embodiment of the invention will now be described with reference to the drawing, which is a section through half a freewheel.

DESCRIPTION OF THE PREFFERRED EMBODIMENTS

The freewheel consists of two rows 3 and 4 of shoes and a roller bearing 5 accommodated between an inner ring 1 and an outer ring 2. Outer ring 2 has a revolving web 6 that extends between rows 3 and 4. The shoes are secured in cages 7 and 8. An activating mechanism 9 simultaneously tightens and releases the shoes. The outer ring 2 in this embodiment is in one piece. Inner ring 1 on the other hand comprises four subsidiary rings 14, 10, 16, and 18, with jacketing ring 10 extending in the shape of a U around rows 3 and 4 and preferably featuring hardened races 11.

The matching races 12 in the web 6 on outer ring 2 are also hardened. The embodiment in question has two rows 3 and 4 of shoes. The clutching forces normal to both rows act on a plane 13, almost totally eliminating the interior forces on the web. The interior normal forces that spread jacketing ring 10 apart equal half the overall normal forces. One of the subsidiary rings that make up inner ring 1 is a ring 14 that secures cage 7 over outer row 3. Securing ring 14 also has a sealing surface that is engaged by a lip on a seal 15 in outer ring 2. Another subsidiary ring is bearing ring 16, which screws onto jacketing ring 10. Bearing ring 16 supports a race wire 17 that is part of roller bearing 5, a double slanted-roller row wire bearing. The other races on wires 17 rest against outer ring 2 and a toothed ring 18 that is also a component of inner ring 1. The teeth 19 on ring 18 are on its inner surface. The individual subsidiary rings 14, 10, 16, and 18 that make up inner ring 1 are secured together with screws 20 and 21. Downstream machinery 23 is also secured to outer ring 2 with screws 22. Screws 24 and 25 secure upstream machinery 26 to inner ring 1. While powerful torques are being maintained, the clutching forces deriving from rows 3 and 4 generate high spreading forces that tend to expand outer ring 2. To prevent this considerable expansion from endangering the function of the freewheel and to allow the employment of small inner and outer rings, the outer ring 2 in one preferred embodiment of the invention has a shoulder 27 and extends beyond the outside diameter of inner ring 1. Once the expanding forces are powerful enough to close gap 28, shoulder 27 will prevent inner ring 1 from expanding farther. Gap 28 must be maintained as narrow as possible. The rotation of the freewheel must of course not be impeded by friction between rings 1 and 2.

We claim:

1. A single-action freewheel with an open diameter greater than 500 mm comprising: an inner ring and an outer ring; at least two rows of shoes between said inner ring and said outer ring; at least one revolving web connected to said rings and extending between said rows; and actuating means for tightening and loosening said shoes, whereby a clutching torque equal substantially to the sum of individual torques of each row of shoes is transmitted, normal forces from said rows and acting on opposite sides of said web having substantially no bending forces; an outer row of shoes being held in a ring expanded through elastic deflection only by a fraction of said normal forces equalling substantially the inverse of the total number of rows, said elastic deflection being substantially independent of said open diameter, for providing reliable blocking function of said freewheel.

2. A single-action freewheel as defined in claim 1, wherein said rows of shoes comprise at least three rows of shoes, said at least one revolving web comprising a plurality of webs connected alternately to said outer ring and said inner ring.

3. A single-action freewheel as defined in claim 1, wherein at least said outer ring is divided into sections comprising a plurality of ring-shaped elements.

4. A single-action freewheel as defined in claim 1, including a housing for said freewheel.

5. A single-action freewheel as defined in claim 1, including fastening means on said inner ring and said outer ring for attachment to upstream and downstream mechanisms.

6. A single-action freewheel as defined in claim 1, including bearing means between said inner ring and said outer ring.

7. A single-action freewheel as defined in claim 1, including a ring member with teeth.

8. A single-action freewheel as defined in claim 1, including a ring adjacent to said rows of shoes and overlapping at least said outer ring.

9. A single-action freewheel as defined in claim 8, wherein said ring adjacent to said rows of shoes comprises a shoulder on said outer ring.

10. A single-action freewheel as defined in claim 9, wherein a gap is located between said shoulder and outside diameter of said outer ring.

11. A single-action freewheel as defined in claim 9, wherein a gap is located between said shoulder and inside diameter of said inner ring.

12. A single-action freewheel with an open diameter greater than 500 mm comprising: an inner ring and an outer ring; at least two rows of shoes between said inner ring and said outer ring; clutching forces acting substantially on one plane or diameter; at least one revolving web connected to said ring and extending between said rows; and actuating means for simultaneously tightening and loosening said shoes, whereby a clutching torque equal substantially to the sub of individual torques of each row of shoes is transmitted, normal forces from said rows and acting on opposite sides of said web having substantially no bending forces; an outer row of shoes being held in a ring expanded through elastic deflection only by a fraction of said normal forces equalling substantially the inverse of the total number of rows, said elastic deflection being substantially independent of said open diameter, for providing reliable blocking function of said freewheel; said at least one revolving web comprising a plurality of revolving webs connected alternately to said outer ring and to said inner ring; at least said outer ring being divided into sections comprising a plurality of rings; a housing; fastening means on said outer ring and said inner ring for attaching to upstream and downstream mechanisms; bearing means positioned between said inner ring and said outer ring; a ring member having teeth; a ring adjacent to said rows of shoes and overlapping at least said outer ring and comprising a shoulder; said shoulder and said outer ring having a gap therebetween.

* * * * *